US012804086B2

(12) United States Patent
Suzuki

(10) Patent No.: US 12,804,086 B2
(45) Date of Patent: Nov. 17, 2026

(54) IMAGE PROCESSING SYSTEM, NON-TRANSITORY COMPUTER READABLE MEDIUM STORING PROGRAM, AND IMAGE PROCESSING METHOD FOR REDUCING USER OPERATIONAL BURDEN IN PREVIEW DISPLAY OF SCANNED DOCUMENT IMAGE

(71) Applicant: FUJIFILM Business Innovation Corp., Tokyo (JP)

(72) Inventor: Kouichi Suzuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/512,041

(22) Filed: Nov. 17, 2023

(65) Prior Publication Data

US 2024/0406320 A1 Dec. 5, 2024

(30) Foreign Application Priority Data

Jun. 5, 2023 (JP) ................................ 2023-092470

(51) Int. Cl.
*H04N 1/00* (2006.01)
*H04N 1/053* (2006.01)
*H04N 1/40* (2006.01)

(52) U.S. Cl.
CPC ....... *H04N 1/0044* (2013.01); *H04N 1/00411* (2013.01); *H04N 1/053* (2013.01); *H04N 1/40093* (2013.01)

(58) Field of Classification Search
CPC ............ H04N 1/0044; H04N 1/00411; H04N 1/053; H04N 1/40093
See application file for complete search history.

(56) References Cited

U.S. PATENT DOCUMENTS

| | | | | |
|---|---|---|---|---|
| 2012/0099128 A1* | 4/2012 | Yoshida | H04N 1/00411 | 358/1.13 |
| 2012/0249597 A1* | 10/2012 | Yoshida | G06F 3/14 | 345/660 |
| 2017/0104888 A1* | 4/2017 | Nomura | H04N 1/00801 | |
| 2020/0133972 A1* | 4/2020 | Yamada | G06T 3/60 | |
| 2023/0242363 A1* | 8/2023 | Ryo | G06F 3/1251 | 242/563 |

FOREIGN PATENT DOCUMENTS

| | | |
|---|---|---|
| JP | 5081885 | 11/2012 |
| JP | 6869035 | 5/2021 |

* cited by examiner

*Primary Examiner* — Juan M Guillermety
(74) *Attorney, Agent, or Firm* — JCIPRNET

(57) ABSTRACT

In an image processing system, in an operation mode in which a document image scanned from a document being transported by a transport mechanism is displayed as a preview on a display unit, the preview of the document image by the transport mechanism is displayed in a form in which an intermediate portion located between end portions of the document in a direction intersecting a direction of transport by the transport mechanism is omitted.

14 Claims, 11 Drawing Sheets

(a)

(b)

IMAGE PROCESSING SYSTEM, NON-TRANSITORY COMPUTER READABLE MEDIUM STORING PROGRAM, AND IMAGE PROCESSING METHOD FOR REDUCING USER OPERATIONAL BURDEN IN PREVIEW DISPLAY OF SCANNED DOCUMENT IMAGE

CROSS-REFERENCE TO RELATED APPLICATIONS

This application is based on and claims priority under 35 USC 119 from Japanese Patent Application No. 2023-092470 filed Jun. 5, 2023.

BACKGROUND

(i) Technical Field

The present invention relates to an image processing system, a non-transitory computer readable medium storing a program, and an image processing method.

(ii) Related Art

For example, JP5081885B discloses a document scanning device having a preview function, the device including a document reading unit that reads a document image, an image processing unit that processes a scanned document image to generate an output image, an output unit that outputs the output image to an outside, and a display unit for causing a user to preview the document image. The image processing unit extracts a range of a predetermined width based on each of the top, bottom, left, and right sides of a rectangular image area end portion as the respective upper, lower, left, and right end portion areas such that the range includes the rectangular image area end portion, and sets, the magnification of a preview image for the top, bottom, left, and right end portion areas, a size in which one pair of end portion areas among the upper and lower pair or the left and right pair of end portion areas fits in a display unit, and other pair does not fit in the display unit. The image processing unit disposes the upper end portion area above the lower end portion area, disposes the left end portion area on the left of the right end portion area, causes the vertical directions of the top, bottom, left, and right end portion areas to coincide with each other, and displays a preview image on the display unit.

SUMMARY

Here, in a case where an image of a document is scanned while transporting the document, a shift or meandering in a direction intersecting a transport direction of the document is likely to occur in a case where a document length in the transport direction or a document width in the intersecting direction increases. For example, it is conceivable that a scanned image is displayed to show the user a situation such as a shift of a document, thereby urging a countermeasure in a case where the shift or the like has occurred. In a case where the scanned image is displayed in a form showing the entire scanned image, the image is reduced in the case of a document having a document length or a document width. In a case where an operation of a user on the display, for example, an operation such as image enlargement or image movement is required, an operational burden of the user on the display during scanning increases.

Aspects of non-limiting embodiments of the present disclosure relate to an image processing system, a non-transitory computer readable medium storing a program, and an image processing method that reduce an operational burden of a user on the display as compared with a case where the entirety of a scanned image is displayed during scanning.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image processing system including one or a plurality of processors configured to, in an operation mode in which a document image scanned from a document being transported by a transport mechanism is displayed as a preview on a display unit, display the preview of the document image by the transport mechanism in a form in which an intermediate portion located between end portions of the document in a direction intersecting a direction of transport by the transport mechanism is omitted.

BRIEF DESCRIPTION OF THE DRAWINGS

Exemplary embodiment(s) of the present invention will be described in detail based on the following figures, wherein:

FIG. 3A is a plan view and FIG. 3B illustrates a portion of a transport mechanism;

DETAILED DESCRIPTION

Hereinafter, an exemplary embodiment of the present invention will be described with reference to the accompanying drawings.

Figure 1:
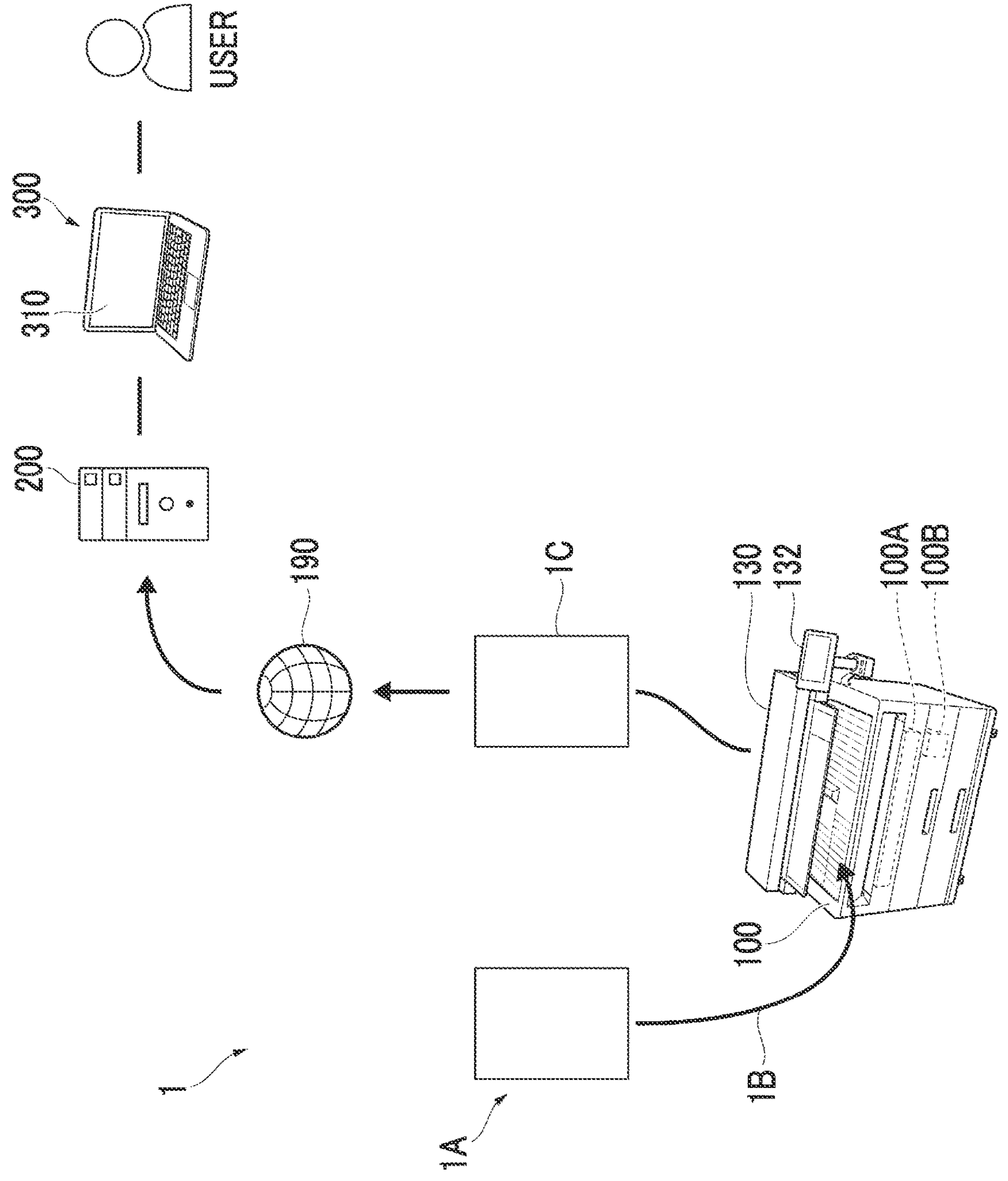
FIG. 1 is a diagram illustrating an example of an image processing system.

FIG. 1 is a diagram illustrating an example of an image processing system 1.

The image processing system 1 in the present exemplary embodiment is provided with an image forming apparatus 100 and a server apparatus 200 connected to the image forming apparatus 100 via a communication line 190. In the present exemplary embodiment, a document 1A is scanned in the image forming apparatus 100 as an example of the image processing system, and the scanned image 1C is created.

Further, the image processing system 1 in the present exemplary embodiment is provided with a user terminal 300 that is connected to the server apparatus 200 and receives an operation from a user.

The user terminal 300 is provided with a display device 310. The user terminal 300 is realized by a computer. Examples of the form of the user terminal 300 include a personal computer (PC), a smartphone, and a tablet terminal.

The image forming apparatus 100 is provided with an image forming unit 100A that forms an image on paper which is an example of a recording medium.

For example, the formation of an image on paper by the image forming unit 100A is performed by an inkjet method or an electrophotographic method. In addition, the formation of an image on paper by the image forming unit 100A is not limited to the inkjet method or the electrophotographic method, and may be performed by other methods.

The image forming apparatus 100 is further provided with an information processing unit 100B. The information processing unit 100B executes various processes executed in the image forming apparatus 100.

Furthermore, the image forming apparatus 100 is provided with an image scanning device 130 that scans the document 1A, creates a scanned image 1C, and transmits the scanned image 1C to the server apparatus 200. The image forming apparatus 100 is provided with an operation reception unit 132 that receives various operations and performs display. The details will be described below.

Figure 2:
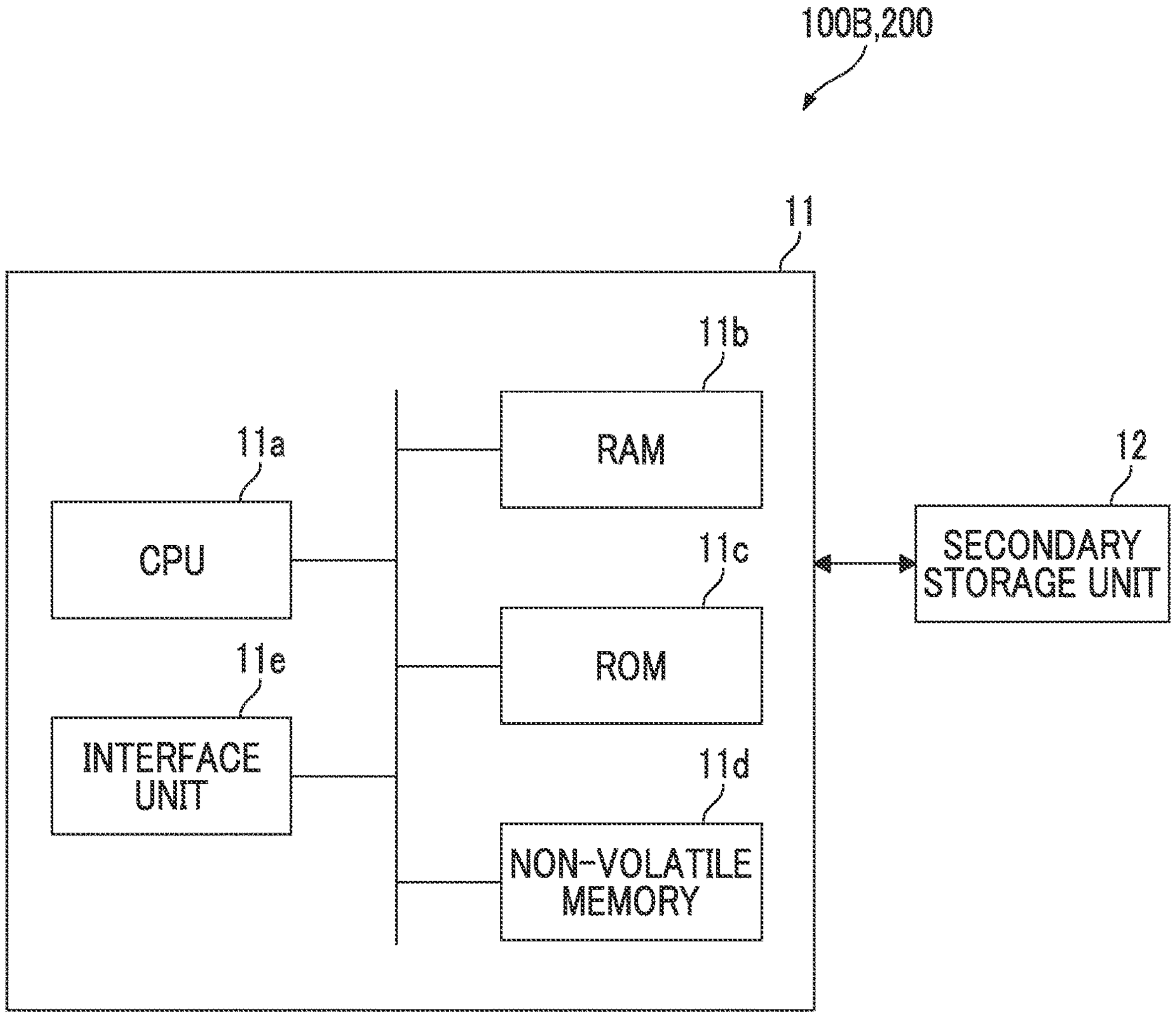
FIG. 2 is a diagram illustrating an example of a hardware configuration of an information processing unit provided in an image forming apparatus and a server apparatus.

FIG. 2 is a diagram illustrating an example of a hardware configuration of the information processing unit 100B provided in the image forming apparatus 100 and the server apparatus 200. The information processing unit 100B provided in the image forming apparatus 100 and the server apparatus 200 are realized by computers.

Each of the information processing unit 100B and the server apparatus 200 includes an arithmetic processing unit 11 that executes a digital arithmetic process according to a program, and a secondary storage unit 12 that stores information.

The secondary storage unit 12 is realized, for example, by a known information storage device such as a hard disk drive (HDD), a semiconductor memory, or a magnetic tape.

The arithmetic processing unit 11 is provided with a CPU 11*a* as an example of a processor.

In addition, the arithmetic processing unit 11 is provided with a RAM 11*b* used as a working memory or the like of the CPU 11*a* and a ROM 11*c* in which programs or the like executed by the CPU 11*a* are stored.

In addition, the arithmetic processing unit 11 is provided with a non-volatile memory 11*d* that is configured to be rewritable and can hold data even in a case in which power supply is interrupted and an interface unit 11*e* that controls each unit, such as a communication unit, connected to the arithmetic processing unit 11.

The non-volatile memory 11*d* is configured by, for example, an SRAM or a flash memory that is backed up by a battery. The secondary storage unit 12 stores the programs executed by the arithmetic processing unit 11 in addition to files and the like.

In the present exemplary embodiment, the arithmetic processing unit 11 reads the program stored in the ROM 11*c* or the secondary storage unit 12 to perform each process.

The program executed by the CPU 11*a* can be provided to the server apparatus 200 and the information processing unit 100B in a state in which the program is stored in a computer-readable recording medium such as a magnetic recording medium (for example, a magnetic tape or a magnetic disk), an optical recording medium (for example, an optical disk), a magneto-optical recording medium, or a semiconductor memory. Further, the program executed by the CPU 11*a* may be provided to the server apparatus 200 and the information processing unit 100B by a communication section such as the Internet.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The processing in the image processing system 1 described below may be performed not only by the CPU 11*a* as an example of a processor provided in the image forming apparatus 100, but also by the CPU 11*a* as an example of a processor provided in the server apparatus 200. The processing may be realized by one apparatus such as one server apparatus 200, or may be realized by a plurality of devices.

The term "system" in the present exemplary embodiment includes both a system configured by a plurality of devices and a system configured by a single device.

Returning to FIG. 1, the image forming apparatus 100 will be described.

In the present exemplary embodiment, as described above, the image forming apparatus 100 is provided with the image forming unit 100A that forms an image on paper which is an example of a recording medium.

Further, the image forming apparatus 100 is provided with the image scanning device 130 as an example of an image scanning section that scans an image of the document 1A.

The image scanning device 130 is a so-called scanner having a transport mechanism 26 (see FIGS. 3A and 3B) for the document 1A, and performs scanning after the transport mechanism 26 transports the document 1A. Image scanning may be referred to as "scanning" below.

The image scanning device 130 includes a light source that emits light with which the document 1A is irradiated, and a light receiving unit such as a CCD, that receives reflected light from the document 1A. In the present exemplary embodiment, a scanned image described later is generated based on the reflected light received by the light receiving unit.

A scanning position for an image is set in advance in the image scanning device 130. The image scanning device 130 sequentially scans an image in an area of the transported document 1A at the scanning position by a line, and reads scanned line data.

In addition, the image forming apparatus 100 has an information transmission function to transmit information to the server apparatus 200 (see FIG. 1).

In the present exemplary embodiment, the image scanning device 130 is provided above the image forming apparatus 100. The image scanning device 130 sequentially scans the document 1A set by the user.

Further, each image forming apparatus 100 is provided with the operation reception unit 132 that receives an operation from the user. The operation reception unit 132 is configured by a so-called touch panel. The operation reception unit 132 displays information for the user and receives an operation performed by the user.

The display of information for the user and the reception of the operation by the user are not limited to being performed by one operation reception unit 132 as in the present exemplary embodiment. The operation reception unit and the information display unit may be provided separately. The operation reception unit 132 is an example of a display unit.

In the present exemplary embodiment, in a case where the document 1A as a scanning target is installed in the image scanning device 130 as indicated by the reference sign 1B in FIG. 1, and a scanning start operation is performed, the transport of the document 1A is started, and the image scanning device 130 scans the document. By scanning the document, the scanned image 1C as data is created.

In the present exemplary embodiment, the scanned image 1C is transmitted to the server apparatus 200 and then is stored in the server apparatus 200.

In the image forming apparatus 100 in the present exemplary embodiment, image formation can be performed on long paper of the A4 size (210 mm×297 mm), the A3 size (420 mm×297 mm), and the size exceeding the A3 size, for example, the A0 size (841 mm×1189 mm) and the size of the A0 width 10 m (841 mm×10000 mm). In addition, image on paper having such a size can be scanned.

Figure 3B:
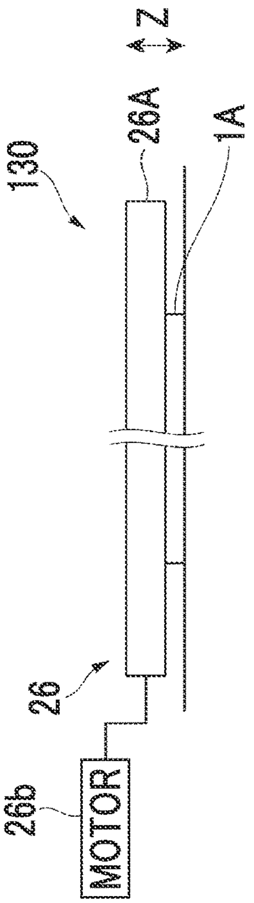
FIGS. 3A and 3B are diagrams illustrating a configuration of an image scanning device, where
Figure 3A:
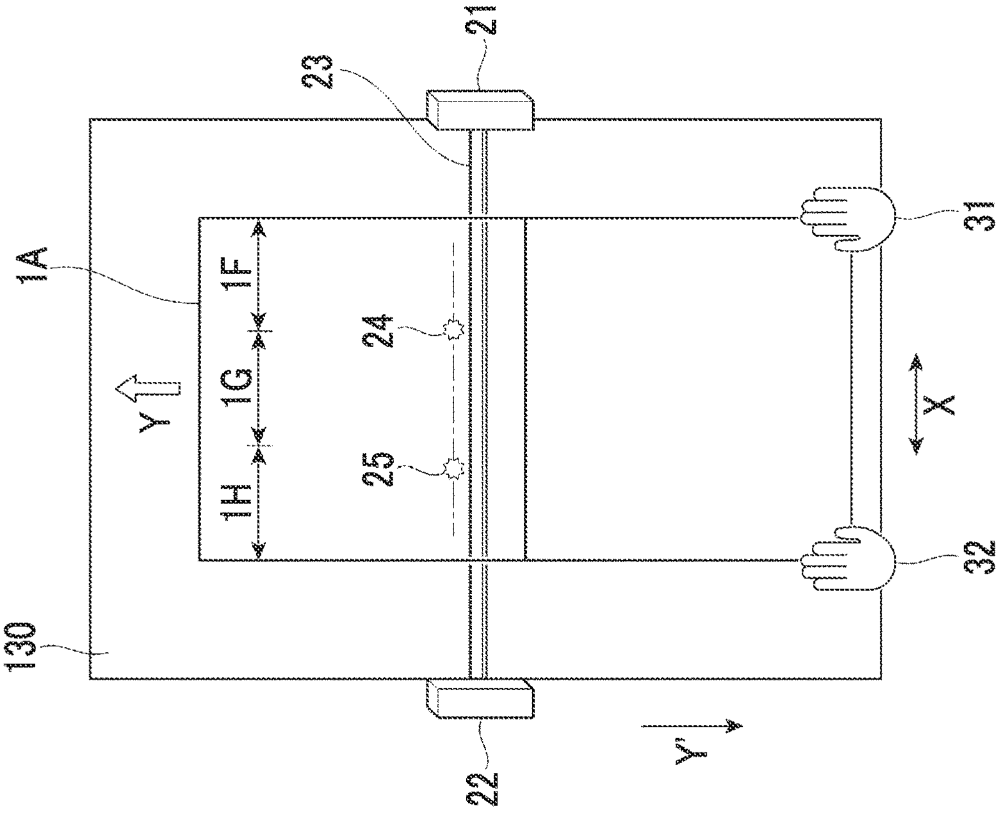

FIGS. 3A and 3B are diagrams illustrating the configuration of the image scanning device 130. FIG. 3A is a plan view and FIG. 3B illustrates a portion of the transport mechanism 26.

As illustrated in FIG. 3A, the image scanning device 130 includes a pair of guide members 21 and 22 and a light receiving unit 23. The pair of guide members 21 and 22 is provided to be spaced apart from each other in an intersection direction X which is a direction intersecting the transport direction Y of the document 1A. The light receiving unit 23 is located between the pair of guide members 21 and 22 and is provided along the intersection direction X. In addition, the image scanning device 130 includes a plurality of document position sensors 24 and 25 that are located between the pair of guide members 21 and 22 and are provided to be spaced apart from each other in the intersection direction X.

The light receiving unit 23 is an example of a scanning unit that scans an image. The document position sensors 24 and 25 are an example of a detection unit provided separately from the scanning unit. The transport direction Y is an example of a direction of transport. The intersection direction X is an example of a direction intersecting the direction of the transport.

The pair of guide members 21 and 22 are provided on a transport surface and define an area through which the document 1A transported in the transport direction Y passes. The guide member 21 is located at one end portion in the intersection direction X, and the guide member 22 is located at the other end portion.

The light receiving unit 23 is, for example, an image sensor or the like for scanning the document 1A by receiving the reflected light obtained in a manner that light emitted from the light source is reflected by the document 1A. The light receiving unit 23 can also be an image scanning unit that outputs image data obtained by scanning.

The document position sensors 24 and 25 optically detect the position of the document 1A, and detect whether or not the document 1A is at a predetermined position. That is, the document position sensors 24 and 25 detect the position shift of the document 1A in the intersection direction X. As a result, the information processing unit 100B (see FIG. 1) determines whether or not to temporarily stop the transport of the document 1A.

In the present exemplary embodiment, two document position sensors 24 and 25 are provided. The present exemplary embodiment is not limited to this, and three or more document position sensors may be provided.

As illustrated in FIG. 3B, the transport mechanism 26 includes a transport roller 26*a* that is rotatably held and a motor 26*b* that rotationally drives the transport roller 26*a*.

The transport roller 26*a* has an elevating mechanism (not illustrated) that is displaceable in the up-down direction Z and can select an upper position and a lower position. In a case where the lower position is selected, the transport roller 26*a* is in a nip state of pressing the upper surface of the document 1A. At the upper position, the transport roller 26*a* is in a non-nip state of not coming into contact with the upper surface of the document 1A. In a case where the motor 26*b* operates at the lower position, the transport roller 26*a* rotates, and the document 1A is transported in the transport direction Y.

The right-hand FIG. 31 and the left-hand FIG. 32 in FIG. 3A exemplify that the user puts a hand on the transported document 1A.

Here, the image forming apparatus 100 has an operation mode of displaying a preview of a document image read from the document 1A being transported by the transport mechanism 26 in the image scanning device 130 on the operation reception unit 132 (see FIG. 1). In transporting the document 1A by the transport mechanism 26, the document 1A meanders in the right-left direction or is skewed in a transport direction Y, and thus approaches guide members 21 and 22, the transport by the transport mechanism 26 is temporarily stopped in order to prevent damage to the document 1A. Therefore, in such an operation mode, the user is urged to suppress the position shift and the meandering of the document while observing the preview display of the operation reception unit 132 (see FIG. 1).

However, in the case of the document 1A having a large length or width such as a large-format document, so-called skew such as position shift or meandering is likely to occur. Thus, in the preview display of the operation reception unit 132, in a case where the entire document image is reduced, the visibility of the user is reduced. In addition, in a case where the operation reception unit 132 is operated to enlarge the preview display during the transport, the user performs the operation while paying attention to the position shift of the document 1A, and thus an operational burden on the user increases.

Therefore, in the present exemplary embodiment, the preview display is performed in a form of omitting an intermediate portion 1G (see FIG. 3A) located between end portions 1F and 1H (see FIG. 3A) of the document 1A, and the reduction ratio of the document image is not reduced. A specific description will be made below.

Figure 4:
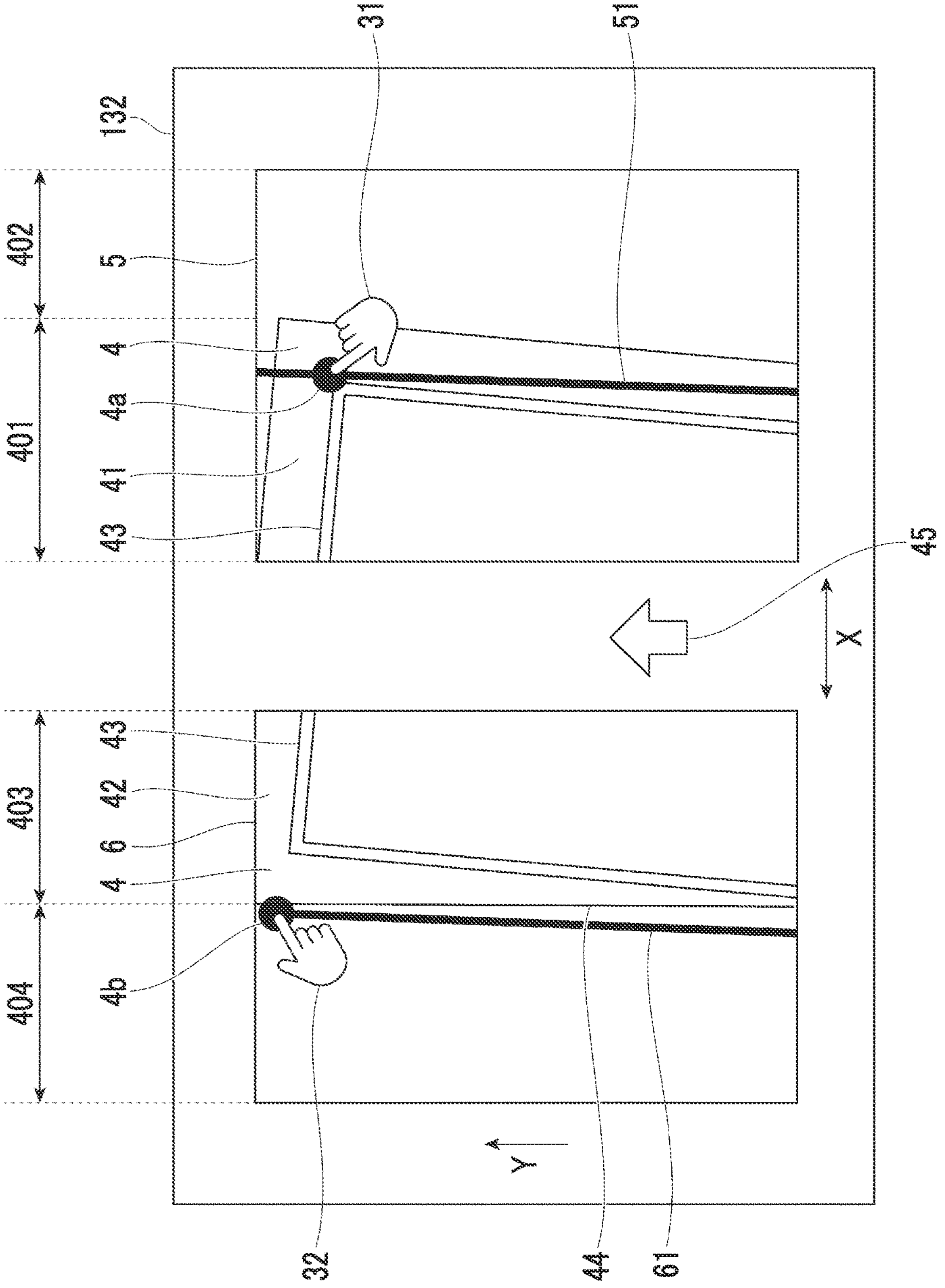
FIG. 4 is a diagram illustrating an example of a preview display of an operation reception unit in an operation mode.

FIG. 4 is a diagram illustrating an example of the preview display of the operation reception unit 132 in the operation mode. The term "preview display" referred herein refers to sequentially displaying, in real time, document images scanned in a stage before scanning is completed in a case where the document 1A (see FIG. 1) is being scanned while being transported.

In the example illustrated in FIG. 4, in the operation mode, the operation reception unit 132 displays a right end display area 5 located on the right side of a screen and a left end display area 6 located on the left side of the screen.

The right end display area 5 is an area in which a right end portion 41 of a document image 4 scanned from a document being transported is displayed. The left end display area 6 is an area in which a left end portion 42 of the document image 4 is displayed.

In the present exemplary embodiment, the scanned document image is stored as data, and only the right and left end portions of the document image are cut out in real time and displayed separately on the right and left sides on the screen. In the present exemplary embodiment, the right end portion 41 and the left end portion 42 of the document image 4 are displayed, but the present exemplary embodiment is not limited to this. It is conceivable to display either the right end portion 41 or the left end portion 42.

The operation reception unit 132 does not display the entire document image 4. The operation reception unit 132 displays the right end portion 41 and the left end portion 42, and omits a display of an intermediate portion located between the right end portion 41 and the left end portion 42. As a result, the right end display area 5 and the left end display area 6 in the operation reception unit 132 are enlarged and displayed larger than in a case where the entire document image 4 is displayed. Thus, the reduction ratio is not reduced.

The right end display area 5 and the left end display area 6 of the operation reception unit 132 are preview displays displayed in real time. In addition, the right end portion 41 and the left end portion 42 are displayed on the operation reception unit 132, and are displayed in a form of omitting the display of the intermediate portion. As a result, a specialized visual and real-time display is performed so that a skew determination of the document 1A, which greatly affects the quality of the document image 4 which is scan data, can be performed during scanning.

Further, during transport of the document 1A, for example, a right corner portion 4*a* of the document image 4 displayed in the right end display area 5 of the operation reception unit 132 is touched, as indicated by a right-hand FIG. 31. In response to such a touch, a right guideline 51 extending linearly in the transport direction Y is displayed at the position of the right corner portion 4*a* in the right end display area 5. The right corner portion 4*a* is a right end portion of a front end 43 which is a front side of the right end portion 41 in the transport direction Y.

Further, as indicated by a left-hand FIG. 32, a position 4*b* of the document image 4 displayed in the left end display area 6 of the operation reception unit 132, which corresponds to, for example, a front end 43 of an outer edge portion 44 is touched. In response to such a touch, a left guideline 61 is displayed at the position 4*b* of the outer edge portion 44 in the left end display area 6.

As described above, the preview display is performed on the operation reception unit 132 in a form in which additional images of the right guideline 51 and the left guideline 61 are added to the document image 4 scanned from the document 1A. That is, the user taps an end portion or another position in the document image, and an auxiliary line extending in the transport direction Y can be overlaid and displayed. In this manner, the visibility of the preview display of the operation reception unit 132 is improved, and the user easily recognizes the state of skews. This makes it easy for the user to manually determine the skew correction of the document and the stop of scanning.

The operation reception unit 132 is an example of a display unit. The right guideline 51 and the left guideline 61 are examples of additional images, and are examples of linear images extending in the direction of transport.

The additional image referred to here refers to an image displayed in a preview display in which the document image 4 is displayed on the operation reception unit 132. Such an additional image includes not only a case of being superimposed on the document image 4 (see FIG. 4 described later), but also a case of being displayed without being superimposed on the document image 4 (see FIG. 5 described later).

A FIG. 45 of an arrow indicating the transport direction Y is displayed between the right end display area 5 and the left end display area 6 in the operation reception unit 132. As a result, the visibility of the document image 4 displayed on the operation reception unit 132 is improved.

In the present exemplary embodiment, the form in which the right end display area 5 and the left end display area 6 are displayed on the operation reception unit 132 is adopted, but the present exemplary embodiment is not limited to this. A form in which either the right end display area 5 or the left end display area 6 is displayed may be adopted. In a case where it is determined that the document 1A is biased, for example, to the right of a predetermined position, it is conceivable to display only the right end display area 5 and omit the display of the left end display area 6.

Figure 5:
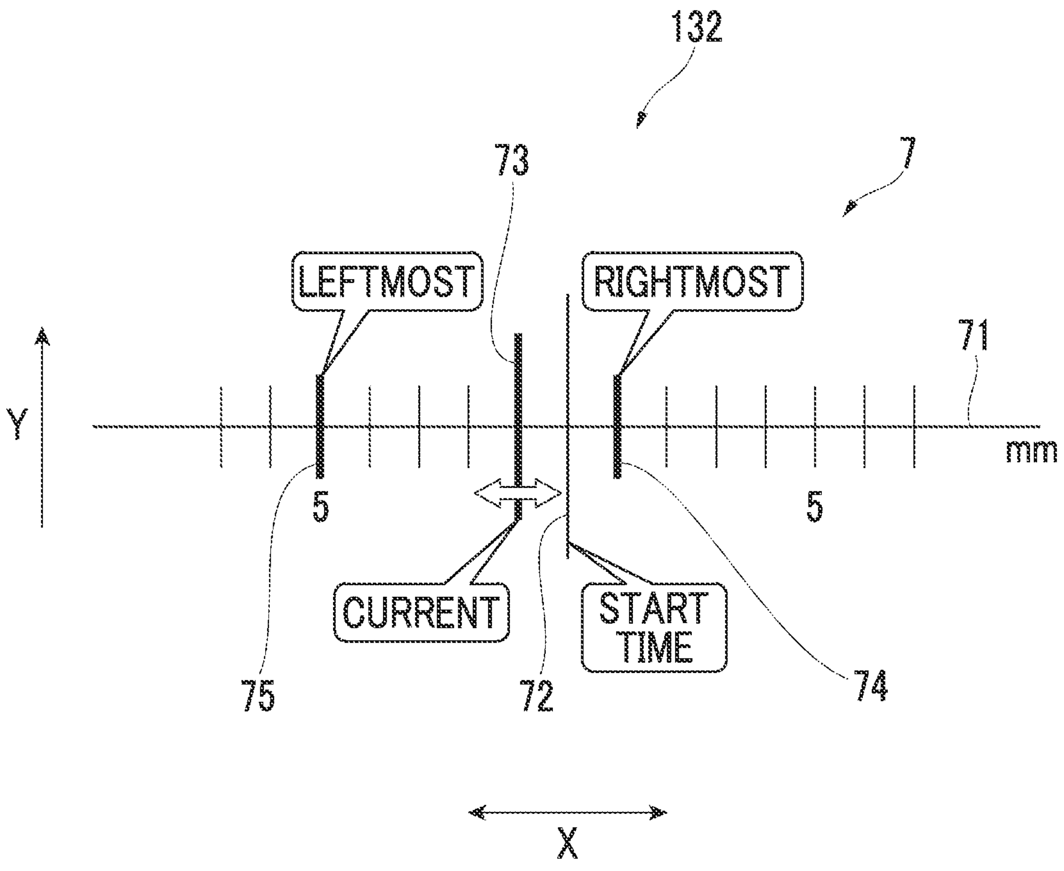
FIG. 5 is a diagram illustrating another display example of the operation reception unit in the operation mode.

FIG. 5 is a diagram illustrating another display example of the operation reception unit 132 in the operation mode.

In the display example illustrated in FIG. 5, the operation reception unit 132 in the operation mode displays an auxiliary image display area 7. In the auxiliary image display area 7, the change in the skew amount is displayed more specifically than in the case of the right end display area 5 and the left end display area 6, and an image of a gauge display is displayed.

The auxiliary image display area 7 is displayed in the operation reception unit 132 together with the right end display area 5 and the left end display area 6 which are preview displays. Only the auxiliary image display area 7 may be displayed in the operation reception unit 132.

In the auxiliary image display area 7, an image of a gauge 71 extending in a direction X intersecting the transport direction Y (referred to as an "intersection direction X" below) is displayed. The gauge 71 includes a scale line for each 1 mm in which a change in the skew amount, that is, the movement amount can be confirmed, and also includes a number "5" indicating that the movement amount is 5 mm. Although the number indicates the maximum value of the movement amount, it is also conceivable to indicate a fixed value as a mark.

The gauge 71 is an example of an image of a scale indicating the movement amount in the intersecting direction. "5" is an example of an image of a number indicating the movement amount in the intersecting direction.

Further, the gauge 71 includes a line 72 of "start time" indicating the position of a predetermined portion of the document image, for example, right end portion, at the start of scanning, and a line 73 of "current time" indicating the current position during scanning. Further, the gauge 71 includes a line 74 of "rightmost" on the rightmost side from the start of scanning to the current time, and a line 75 of "leftmost" on the leftmost side. With the display of the gauge 71, it is possible to understand the shift numerically. The line 72 of "start time" is an example of an image indicating the position of the end portion in a case where scanning of the document being transported is started. The line 73 of "current time" is an example of an image indicating the position of the end portion being scanned.

A double arrow having an arrow in the right-left direction to indicate changeability is also represented in the line 73 of "current time".

As described above, in the auxiliary image display area 7, in a case where an image is displayed in real time while scanning is being performed, in addition to the line 73 of "current time" that may be sequentially changed in real time, the lines 72, 74, and 75 indicating the past state are displayed. Therefore, the peak of the position shift is displayed in the auxiliary image display area 7.

By displaying the auxiliary image display area 7, it is possible to understand how much the shift is at the maximum, and it is possible to check the shift situation after scanning even in a case of meandering.

The auxiliary image display area 7 is a small display area. Even though the auxiliary image display area 7 is displayed on the screen of the operation reception unit 132 together with the preview display, it is possible to suppress the small display.

It is conceivable that, in a case where the auxiliary image display area 7 is displayed on the screen of the operation reception unit 132 together with the preview display, a touch operation is performed in a direction opposite to the transport direction Y after scanning is completed, a scroll display in which the display portion of the document image is brought back to the opposite direction is enabled. In such a case, it is possible to understand whether or not the image is cut out at the position of the document image corresponding to the line 74 of "rightmost" and the line 75 of "leftmost", and it is possible to determine whether or not rescanning is necessary.

The gauge 71 or the like displayed in the auxiliary image display area 7 is an example of an additional image.

Next, the functional configuration in the present exemplary embodiment will be described.

Figure 6:
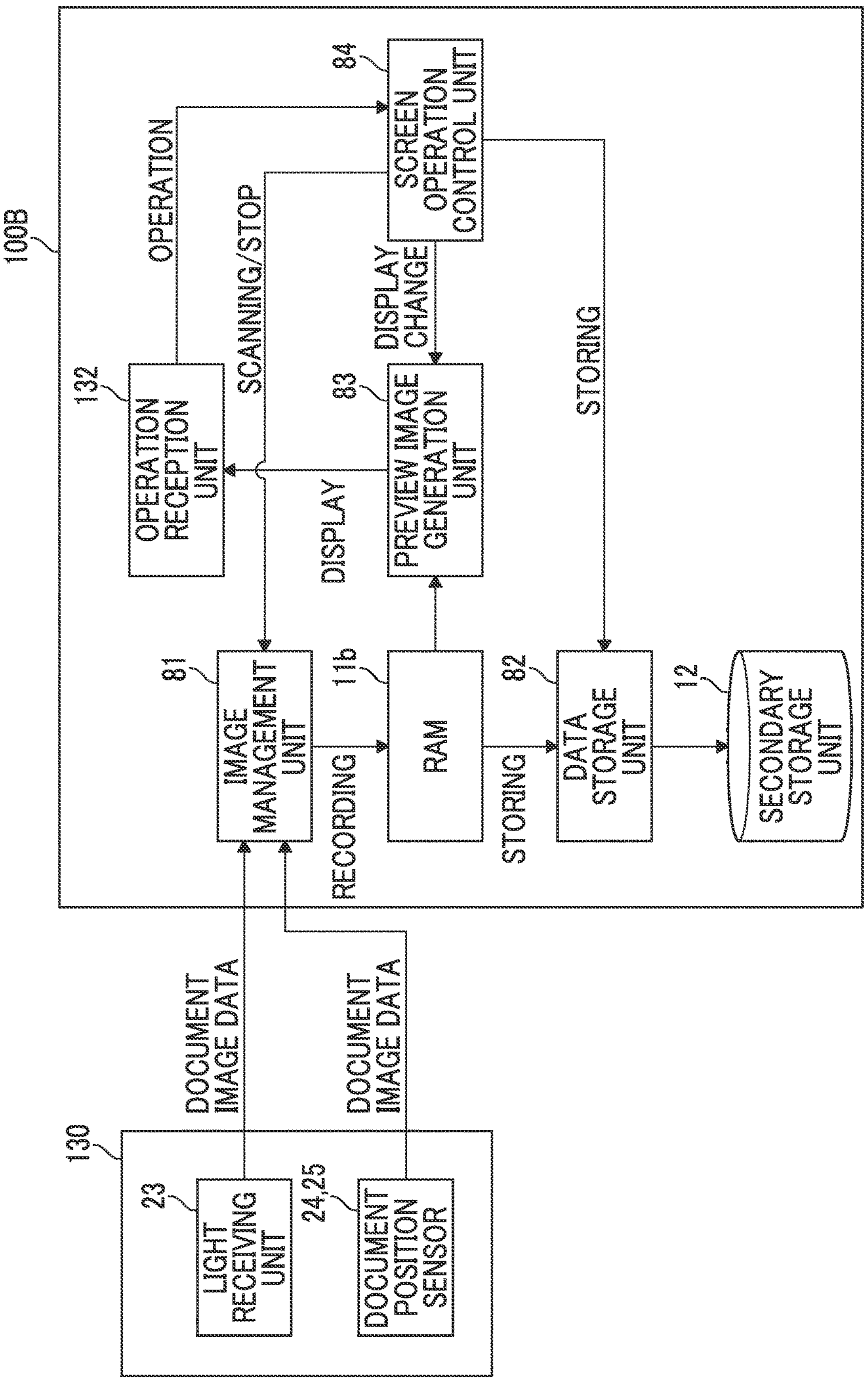
FIG. 6 is a block diagram illustrating a functional configuration in the present exemplary embodiment.

FIG. 6 is a block diagram illustrating the functional configuration in the present exemplary embodiment.

In the configuration example illustrated in FIG. 6, the image scanning device 130 includes the light receiving unit 23 and the document position sensors 24 and 25 described above.

The information processing unit 100B includes an image management unit 81 that manages document image data generated by the light receiving unit 23 and document position data detected by the document position sensors 24 and 25, and a data storage unit 82 that stores image data and the document position data.

The image management unit 81 records the document image data and the document position data in the RAM 11*b*. The recorded document image data and document position data are stored in the secondary storage unit 12 by the data storage unit 82.

The information processing unit 100B further includes a preview image generation unit 83. The preview image generation unit 83 generates a preview image to be displayed on the screen at the time of preview display by using the document image data and the document position data. In addition, the preview image generation unit 83 causes the generated preview image to be displayed on the operation reception unit 132.

The preview image referred to here includes images displayed in the right end display area 5 and the left end display area 6 described above, and also includes an image displayed in the auxiliary image display area 7 in a case where the auxiliary image display area 7 is provided.

The information processing unit 100B further includes a screen operation control unit 84. The screen operation control unit 84 performs control for changing the display in a case where it is detected that an operation of the user on the operation reception unit 132 has been performed. That is, the screen operation control unit 84 instructs the preview image generation unit 83 to change the display. The preview image generation unit 83 generates a new preview image.

Such an operation of a user includes, for example, a screen touch operation by the right-hand FIG. 31 (see FIG. 4), a screen touch operation instructing the scroll display described above, and the like. In addition, an operation of instructing a predetermined enlargement/reduction display may be considered.

Although the configuration in which the information processing unit 100B of the image forming apparatus 100 performs the image processing has been described, the present exemplary embodiment is not limited to this. The server apparatus 200 may perform the image processing.

The information processing unit 100B of the image forming apparatus 100 or the server apparatus 200 is an example of the information processing apparatus.

Figure 7:
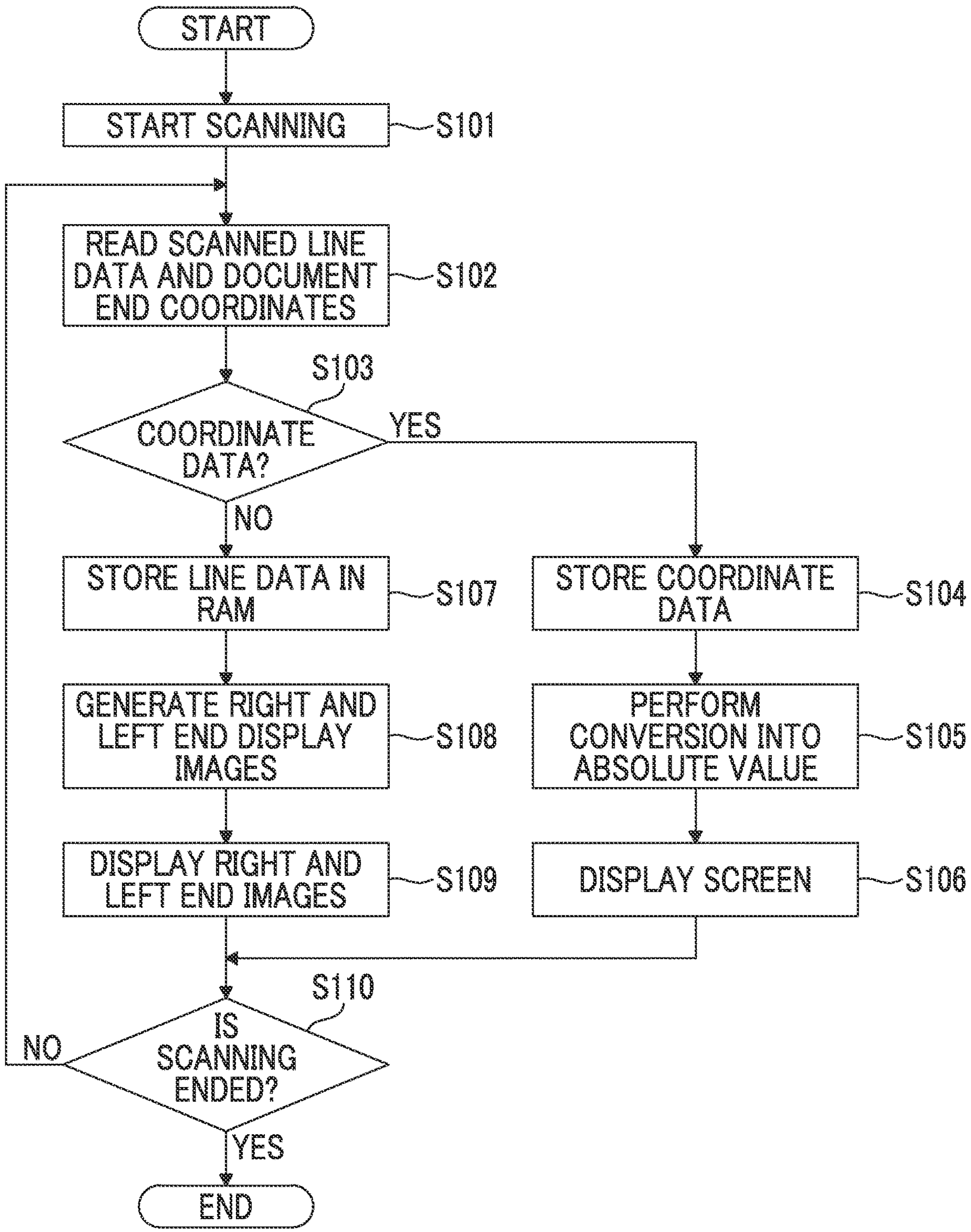
FIG. 7 is a flowchart illustrating a processing procedure in a case where a preview display is performed.

FIG. 7 is a flowchart illustrating a processing procedure in a case where the preview display is performed.

In the processing example illustrated in FIG. 7, in a case where a document 1A (see FIGS. 3A and 3B) is transported and scanning by the light receiving unit 23 is started (Step S101), data such as scanned line data and document end coordinate data is read (Step S102).

Figure 8:
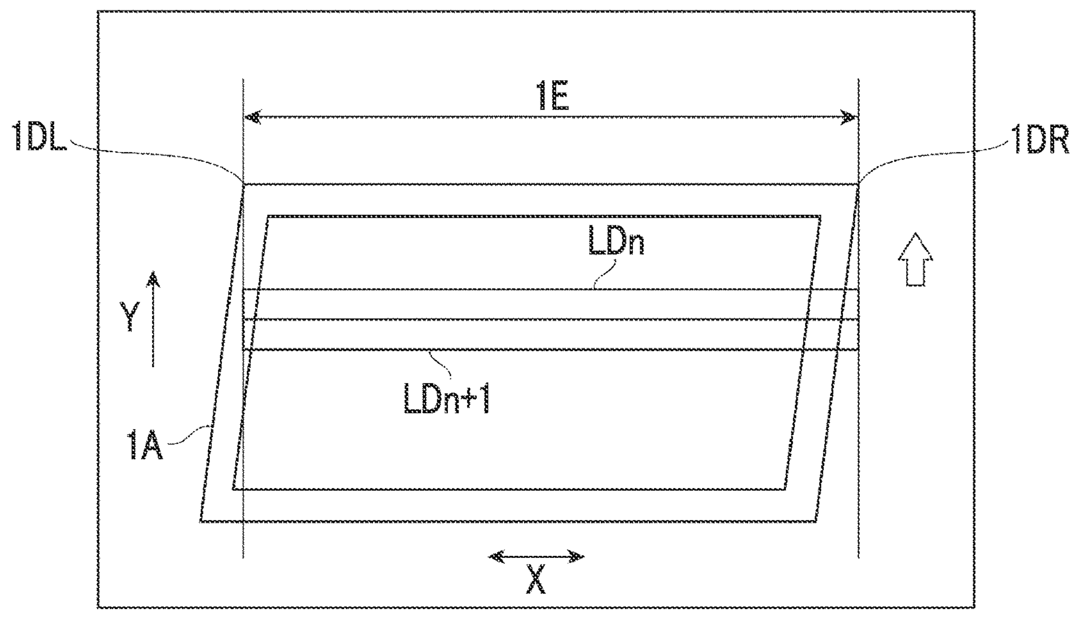
FIG. 8 is diagrams illustrating generation of a gauge displayed in an auxiliary image display area, where (a) of FIG. 8A illustrates a document and (b) of FIG. 8 illustrates the gauge.
Figure 8:
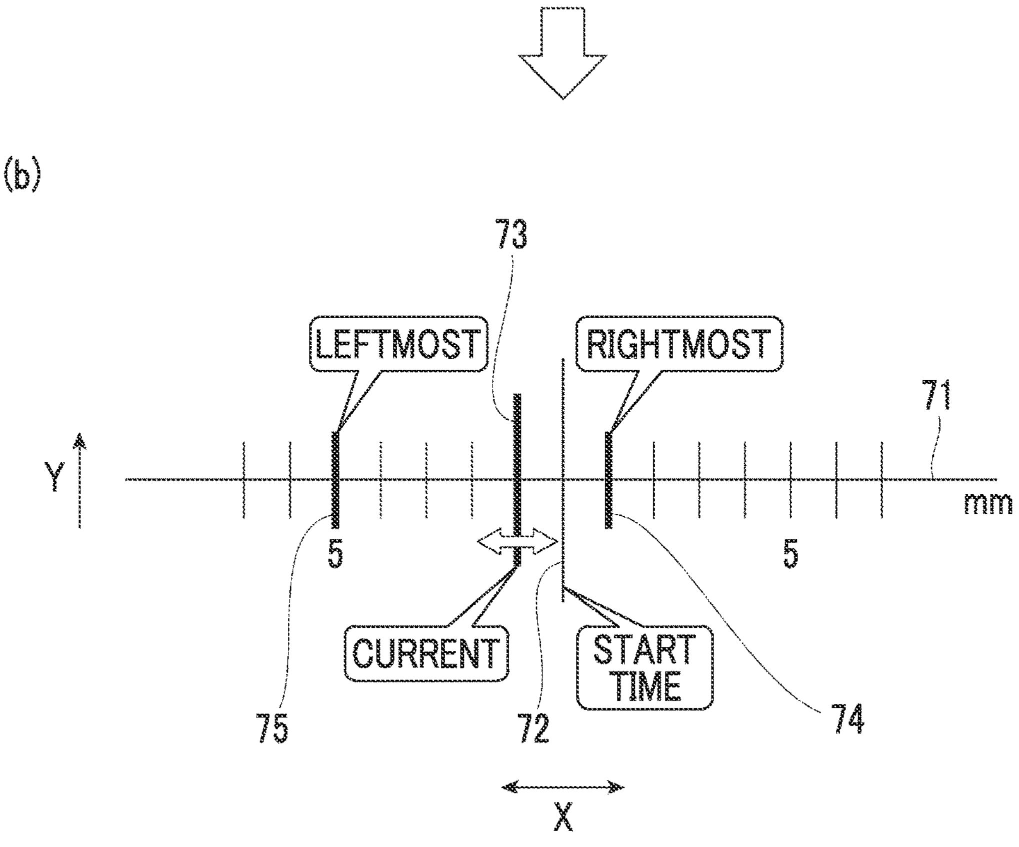

The document end coordinate data is data of the document end coordinates (refer to the document end coordinates 1D and 1E illustrated in FIG. 8) for specifying the position of the end portion of the document 1A. Thus, a scanning range of the document 1A is determined. Further, the right end portion 41 and the left end portion 42 (see FIG. 4) displayed in the right end display area 5 and the left end display area 6 are specified by the document end coordinate data. The document end coordinate data is referred to as "coordinate data" below.

Here, the coordinate data is also used to determine ranges of the right end portion 41 and the left end portion 42 (see FIG. 4) displayed in the right end display area 5 and the left end display area 6 of the document image 4.

Further, in the right end display area 5, the display ratio of a display portion 401 of the right end portion 41 and a portion 402 other than the document image 4 in the right-left direction may be fixed to, for example, 50:50. In such a case, in the left end display area 6, the display ratio of a display portion 403 of the left end portion 42 and a portion 404 other than the document image 4 in the right-left direction may be fixed to, for example, 50:50.

Each of the end portions 1F and 1H (see FIGS. 3A and 3B) of the document 1A corresponding to the display portions 401 and 403 is an example of an end portion of a document in the intersecting direction. A portion of the image scanning device 130 (FIGS. 3A and 3B) corresponding to the display portions 402 and 404 is an example of an area outside the document. In addition, such a display ratio is an example of a ratio between the end portion of the document in the intersecting direction and an area outside the document, and for example, 50:50 described above is an example of a predetermined value.

In addition to 50:50, the fixed value may be changeable by setting. For example, the display portions 401 and 403 may be made larger than the display portions 402 and 404 so that the display ratios are different, such as 60:40.

Further, the display ratio may be changeable instead of a fixed value. That is, the display ratio may be changeable by the user selecting any of the predetermined values, or may be changeable by the user inputting a numerical value.

In the present exemplary embodiment, the above-described display ratios in the right end display area 5 and the left end display area 6 are equal to each other, but different display ratios may be considered.

The description will be continuously made by returning to the flowchart. It is determined whether or not the read data is the coordinate data (Step S103). In the case of the coordinate data (Yes in Step S103), the acquired coordinate data is stored in the RAM 11*b* (Step S104). The preview image generation unit 83 converts the coordinate data into an absolute value (Step S105), and screen display for the gauge 71 (see FIG. 5) is controlled (Step S106). Thereafter, the process proceeds to Step S110 described later.

In a case where the read data is not the coordinate data (No in Step S103), the read data is line data, and thus the line data is stored in the RAM 11*b* (Step S107). The preview image generation unit 83 (see FIG. 4) generates left and right end display images, that is, images of the right end portion 41 and the left end portion 42 (see FIG. 4) to be displayed in the right end display area 5 and the left end display area 6 (Step S108), and displays the generated image on the operation reception unit 132 (Step S109).

The image management unit 81 determines whether or not the scanning is ended (Step S110). In a case where the scanning is not ended (No in Step S110), the process returns to Step S102. In a case where the scanning is ended (Yes in Step S110), a series of processes is ended.

Figure 9:
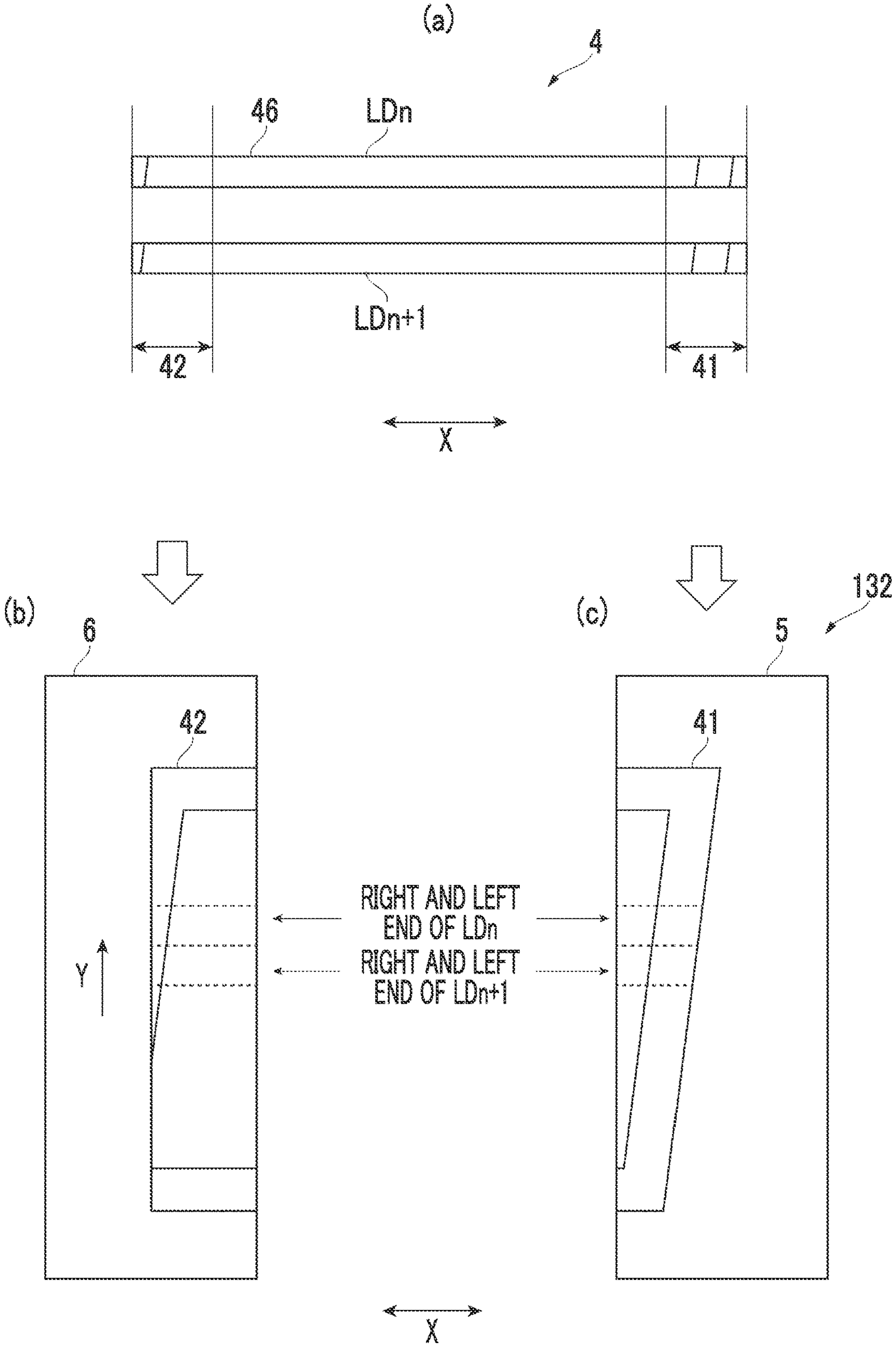
FIG. 9 is diagrams illustrating generation of a right end portion and a left end portion of a document image displayed in a right end display area and a left end display area, where (a) of FIG. 9 illustrates line data, (b) of FIG. 9 illustrates the right end portion, and (c) of FIG. 9 illustrates the left end portion.

FIGS. 8 and 9 are diagrams illustrating generation of an image to be displayed on the operation reception unit 132 based on the line data. More specifically, FIG. 8 is diagrams illustrating generation of the gauge 71 displayed in the auxiliary image display area 7. (a) of FIG. 8 illustrates the document 1A, and (b) of FIG. 8 illustrates the gauge 71. FIG. 9 is diagrams illustrating generation of the right end portion 41 and the left end portion 42 of the document image 4 displayed in the right end display area 5 and the left end display area 6. (a) of FIG. 9 illustrates line data, (b) of FIG. 9 illustrates the right end portion 41, and (c) of FIG. 9 illustrates the left end portion 42.

As illustrated in (a) of FIG. 8, in a case where the document end coordinates 1D and 1E of the document 1A as coordinate data are acquired, a scanning range 1E is determined by first document end coordinates 1DR and 1DL.

In the gauge 71 illustrated in (a) of FIG. 8, the position of the line 72 of "start time" is determined by the first document end coordinates 1D and 1E.

Further, every time the document end coordinates 1D and 1E are acquired by scanning the document 1A transported in the transport direction Y, the line 73 of "current time" in the intersection direction X is updated. Further, the line 74 of "rightmost" and the line 75 of "leftmost" are changed by comparing the line 72 of "start time" with the line 73 of "current time" that changes during scanning.

As illustrated in (a) of FIG. 8, line data LDn and the subsequent line data LDn+1 are transmitted to the image management unit 81 (see FIG. 6) by scanning the document 1A transported in the transport direction Y.

As illustrated in (a) of FIG. 9, the right end portion 41 and the left end portion 42 of the document image 4 are set for the line data LDn and LDn+1. As illustrated in (b) of FIG. 9, the set right end portion 41 and left end portion 42 are displayed in the right end display area 5 and the left end display area 6 on the screen of the operation reception unit 132, respectively. In other words, on the screen of the operation reception unit 132, the display of an intermediate image portion 46 located between the right end portion 41 and the left end portion 42 in the document image 4 illustrated in (a) of FIG. 9 is omitted. As a result, the right end portion 41 and the left end portion 42 can be displayed larger on the screen of the operation reception unit 132. The intermediate image portion 46 referred to here is an image of the intermediate portion 1G (see FIG. 3A) of the document 1A.

Next, a content to be displayed on the operation reception unit 132 in a case where the skew amount of the document 1A is increased during scanning will be described.

Figure 10:
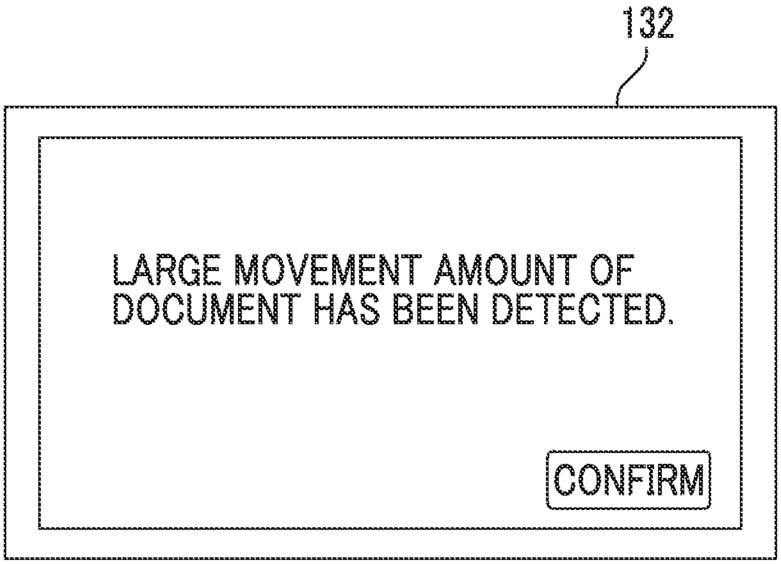
FIG. 10 is a diagram illustrating a display example of an operation reception unit in a case where a skew amount of a document is increased during scanning.

FIG. 10 is a diagram illustrating a display example of the operation reception unit 132 in a case where the skew amount of the document 1A is increased during scanning.

In the display example illustrated in FIG. 10, a guidance display that "a large movement amount of the document has been detected" is performed to the user. Such guidance is displayed on the operation reception unit 132 in a case where the skew amount exceeds a predetermined threshold value.

Accordingly, the skew amount displayed on the gauge 71, that is, the position of the line 74 of "rightmost" and the line 75 of "leftmost" (see, for example, (b) of FIG. 8) can be confirmed, the scanning can be stopped, and an opportunity to determine whether or not the scanning is performed again can be given to the user.

Figure 11:
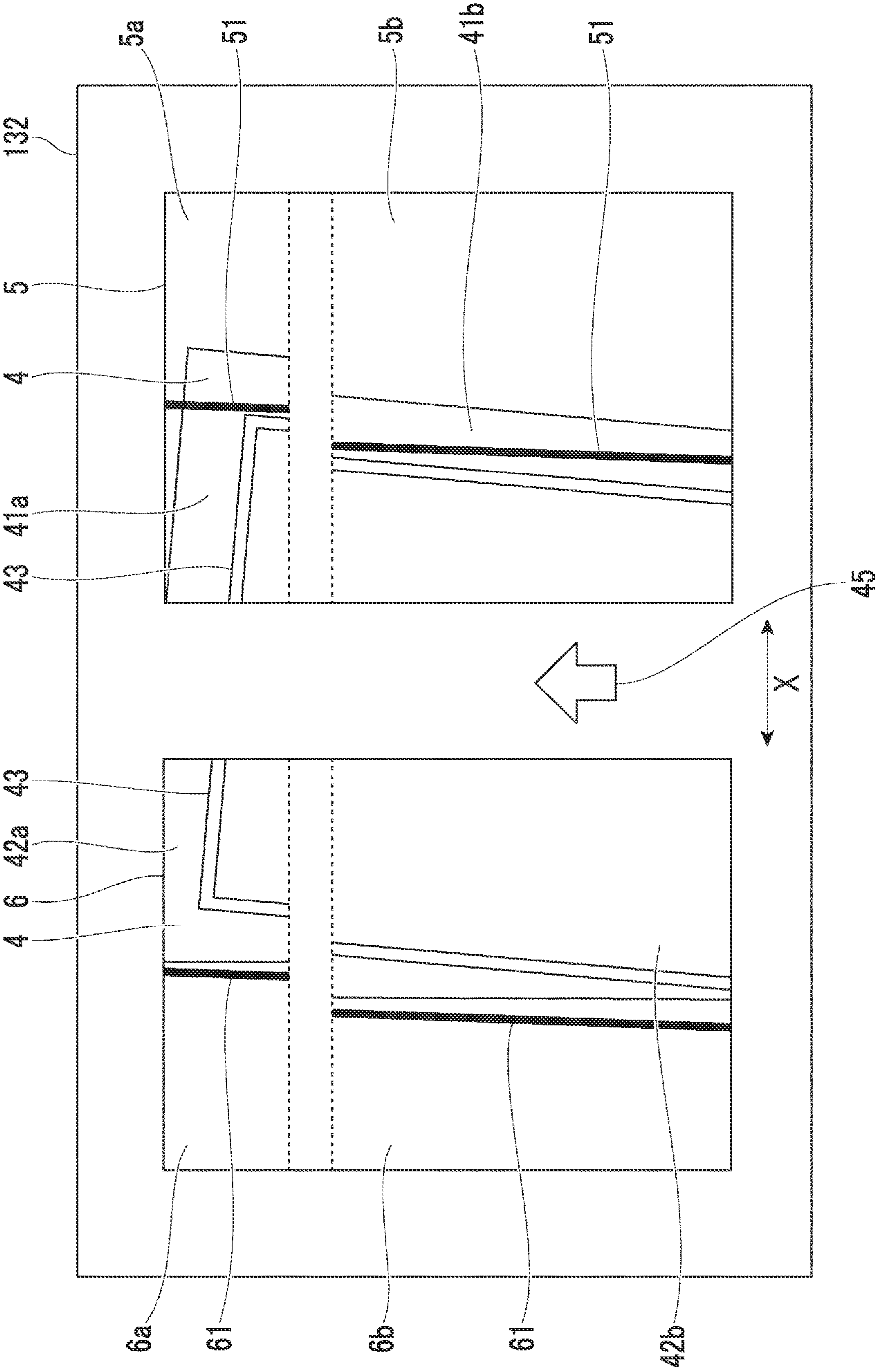
FIG. 11 is a diagram illustrating another example of the preview display of the operation reception unit in the operation mode.

FIG. 11 is a diagram illustrating another example of the preview display of the operation reception unit 132 in the operation mode, and corresponds to FIG. 4 described above.

In another example illustrated in FIG. 11, the right end display area 5 and the left end display area 6 are displayed. The right end display area 5 has a first area 5*a* and a second area 5*b*, and the left end display area 6 has a first area 6*a* and a second area 6*b*.

The first area 5*a* of the right end display area 5 displays the right end portion 41*a* of the document image 4 scanned first, and the second area 5*b* displays the right end portion 41*b* of the document image 4 scanned thereafter. More specifically, during scanning, in the first area 5*a*, the identical image including the front end 43 as the right end portion 41*a* is continuously displayed in a fixed manner. On the other hand, in the second area 5*b*, as the right end portion 41*b*, an update display for displaying the latest image updated with the transport in the transport direction Y is performed. Therefore, in the right end display area 5, a right guideline 51 of the first area 5*a* and a right guideline 51 of the second area 5*b* are not continuous with respect to the intersection direction X.

The first area 6*a* of the left end display area 6 displays the left end portion 42*a* of the first scanned document image 4, and the second area 6*b* displays the left end portion 42*b* of the document image 4 scanned thereafter.

During scanning, the left end display area 6 is the same as the case of the right end display area 5 described above. That is, in the first area 6*a*, the fixed display that is the same as in the first area 5*a* is performed. In the second area 6*b*, the update display that is the same as in the second area 5*b* is performed.

The left guideline 61 of the left end display area 6 is not continuous with each other in the first area 6*a* and the second area 6*b* with respect to the intersection direction X.

The first area 5*a* of the right end display area 5 and the first area 6*a* of the left end display area 6 are areas for displaying a document image of a portion of the document first scanned. The second area 5*b* of the right end display area 5 and the second area 6*b* of the left end display area 6 are areas for displaying a document image by scanning in the transport direction. That is, the display form illustrated in FIG. 11 is an example of a form in which the document image of the portion of the document scanned first is displayed, and the document image by scanning in the direction of transport is displayed.

Supplementary Note (((1)))

An image processing system comprising:

one or a plurality of processors configured to:

in an operation mode in which a document image scanned from a document being transported by a transport mechanism is displayed as a preview on a display unit, display the preview of the document image by the transport mechanism in a form in which an intermediate portion located between end portions of the document in a direction intersecting a direction of transport by the transport mechanism is omitted.

(((2)))

The image processing system according to (((1))), wherein the form of the preview display is a form including the end portions of the document image.

(((3)))

The image processing system according to (((2))), wherein the form including the end portions of the document image displays a ratio of the end portion of the document and an area outside the document in the intersecting direction with a predetermined value.

(((4)))

The image processing system according to (((3))), wherein the predetermined value is changeable by setting.

(((5)))

The image processing system according to (((1))), wherein the form of the preview display is a form in which an additional image for understanding a movement of the document due to transport in the intersecting direction is added.

(((6)))

The image processing system according to (((5))), wherein the additional image is a linear image extending in the direction of the transport.

(((7)))

The image processing system according to (((5))), wherein the additional image is an image of a scale indicating a movement amount in the intersecting direction.

(((8)))

The image processing system according to (((7))), wherein the image of the scale includes an image indicating a position of the end portion in a case where scanning of the document being transported is started, and an image indicating a position of the end portion being scanned.

(((9)))

The image processing system according to (((5))), wherein the additional image is an image of a numerical value indicating a movement amount in the intersecting direction.

(((10)))

The image processing system according to (((9))), wherein the additional image includes an image that calls attention to a user in a case where the numerical value exceeds a predetermined threshold value.

(((11)))

The image processing system according to any one of (((1))) to (((10))), wherein the form of the preview display is a form of displaying a document image of a portion of the document, which has been scanned first, and displaying the document image by scanning in the direction of the transport.

(((12)))

The image processing system according to any one of (((1))) to ((11))

wherein the display unit is able to change a display range of the document image after scanning is ended.

(((13)))

A program causing an information processing apparatus to realize:

in an operation mode in which a document image scanned from a document being transported by a transport mechanism is displayed as a preview on a display unit, a function of acquiring the document image by the transport mechanism; and a function of displaying a preview of the acquired document image in a form in which an intermediate portion located between end portions of the document in a direction intersecting a direction of transport by the transport mechanism is omitted.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing system, wherein, in an operation mode in which a document image scanned from a document being transported by a transport mechanism is displayed as a preview on a display unit, the preview of the document image by the transport mechanism is displayed in a form in which an intermediate portion located between end portions of the document in a direction intersecting a direction of transport by the transport mechanism is omitted.

2. The image processing system according to claim 1, wherein the form of the preview display is a form including the end portions.

3. The image processing system according to claim 2, wherein the form including the end portions displays a ratio of the end portion of the document and an area outside the document in the intersecting direction with a predetermined value.

4. The image processing system according to claim 3, wherein the predetermined value is changeable by setting.

5. The image processing system according to claim 1, wherein the form of the preview display is a form in which an additional image for understanding a movement of the document due to transport in the intersecting direction is added.

6. The image processing system according to claim 5, wherein the additional image is a linear image extending in the direction of the transport.

7. The image processing system according to claim 5, wherein the additional image is an image of a scale indicating a movement amount in the intersecting direction.

8. The image processing system according to claim 7, wherein the image of the scale includes an image indicating a position of the end portion in a case where scanning of the document being transported is started, and an image indicating a position of the end portion being scanned.

9. The image processing system according to claim 5, wherein the additional image is an image of a numerical value indicating a movement amount in the intersecting direction.

10. The image processing system according to claim 9, wherein the additional image includes an image that calls attention to a user in a case where the numerical value exceeds a predetermined threshold value.

11. The image processing system according to claim 1, wherein the form of the preview display is a form of displaying a document image of a portion of the document, which has been scanned first, and displaying the document image by scanning in the direction of the transport.

12. The image processing system according to claim 1, wherein the display unit is able to change a display range of the document image after scanning is ended.

13. A non-transitory computer readable medium storing a program causing an information processing apparatus to realize:

in an operation mode in which a document image scanned from a document being transported by a transport mechanism is displayed as a preview on a display unit, a function of acquiring the document image by the transport mechanism; and a function of displaying a preview of the acquired document image in a form in which an intermediate portion located between end portions of the document in a direction intersecting a direction of transport by the transport mechanism is omitted.

14. An image processing method comprising:

in an operation mode in which a document image scanned from a document being transported by a transport mechanism is displayed as a preview on a display unit, acquiring the document image by the transport mechanism; and displaying a preview of the acquired document image in a form in which an intermediate portion located between end portions of the document in a direction intersecting a direction of transport by the transport mechanism is omitted.

* * * * *